(12) United States Patent
Menten et al.

(10) Patent No.: US 8,356,332 B2
(45) Date of Patent: Jan. 15, 2013

(54) EXTENSIBLE PROTOCOL VALIDATION

(75) Inventors: Lawrence E. Menten, Upper Saddle River, NJ (US); Alan S. Jeffrey, Chicago, IL (US); Thomas B. Reddington, Mountain Lakes, NJ (US)

(73) Assignee: Alcatel Lucent, Paris (FR)

( * ) Notice: Subject to any disclaimer, the term of this patent is extended or adjusted under 35 U.S.C. 154(b) by 509 days.

(21) Appl. No.: 12/462,175

(22) Filed: Jul. 30, 2009

(65) Prior Publication Data

US 2011/0030028 A1    Feb. 3, 2011

(51) Int. Cl.
*H04L 29/06* (2006.01)
(52) U.S. Cl. .................. 726/1; 726/11; 726/12; 726/13; 726/14; 713/151; 713/152; 713/153; 713/154; 709/217; 709/219; 709/223; 709/224; 709/225; 709/227; 709/228; 709/229
(58) Field of Classification Search .......... 726/1, 11–14; 713/151–154; 709/217–219, 223–229
See application file for complete search history.

(56) References Cited

U.S. PATENT DOCUMENTS

| | | | |
|---|---|---|---|
| 6,587,466 B1 * | 7/2003 | Bhattacharya et al. | 370/395.21 |
| 7,401,326 B1 | 7/2008 | Durham et al. | |
| 7,668,969 B1 * | 2/2010 | Kashyap et al. | 709/238 |
| 2005/0229246 A1 | 10/2005 | Rajagopal et al. | |
| 2005/0283823 A1 * | 12/2005 | Okajo et al. | 726/1 |
| 2007/0226483 A1 * | 9/2007 | Cox et al. | 713/151 |
| 2008/0101222 A1 * | 5/2008 | Christenson | 370/230 |
| 2009/0119768 A1 | 5/2009 | Walters et al. | |

FOREIGN PATENT DOCUMENTS

| | | |
|---|---|---|
| GB | 2 443 240 | 4/2008 |
| WO | WO 03/049400 | 6/2003 |

OTHER PUBLICATIONS

Design and Performance of the OpenBSD Stateful Packet Filter by Daniel Hartmeier; Publisher: USENIX; Date: Jun. 2002.*
Packet Classification using Tuple Space Search by Srinivasan et al; Publisher: ACM; Year: 1999.*

* cited by examiner

*Primary Examiner* — Thanhnga B Truong
*Assistant Examiner* — Madhuri Herzog
(74) *Attorney, Agent, or Firm* — Garlick & Markison; Holly L. Rudnick (57) ABSTRACT

A method comprises operations for receiving a binary data structure including a portion representing a protocol validation specification expressed in a respective protocol validation specification language and for receiving a security policy rule having an action part specifying that the binary data structure is to be used for verifying that application protocol payload of network packets complies with the protocol validation specification. After receiving the binary data structure and the security policy rule, an operation is performed for verifying that application protocol payload of received network packets complies with the protocol validation specification. Such verifying is initiated in response to determining that the security policy rule applies to the received network packets and such verifying includes validating the application protocol payload of the received network packets against the binary data structure.

27 Claims, 4 Drawing Sheets

EXTENSIBLE PROTOCOL VALIDATION

FIELD OF THE DISCLOSURE

The disclosures made herein relate generally to computer network firewalls and, more particularly, but not exclusively, to application layer filters in computer network firewalls.

BACKGROUND

There has been the shift in focus of network attacks from denial of service to system compromise and an increase in the sophistication and success of attacks against application layer protocols. As a result, application layer protocol validation is one example of an approach that has been used to address this shift in focus of network attacks to firewall and intrusion detection and prevention systems. An application filter comprises instructions that provide a supplemental layer of security at a firewall, intrusion detection system or other type of network interface protection apparatus. Application filters can access data stream or datagrams associated with a communication session of a network interface protection apparatus. Application filters can perform protocol-specific or system-specific tasks such as, for example, authentication and virus checking.

Application filters generally require long development lead times for the design, implementation and testing of packet filtering code and the management code to support such packet filtering features. Consequently, it has been impractical to customize application layer filtering features for particular customers and it has been difficult to keep up with the rapid evolution of attacks against these application-layer protocols. Furthermore, such application layer filtering features are typically custom coded (i.e., handcrafted by a programmer) and, thus, introduce high processor overhead and unpredictable latency and jitter in the filtered traffic.

One known approach for providing customized application layer filtering involves creating custom-coded packet inspection features that are then loaded into a firewall to customize or update standard filtering features of the firewall. For example, Check Point Software Technologies of Redwood City, Calif. USA offers a firewall product having functionality that allows a customer (i.e., Checkpoint user) to create packet inspection features using a language provided for that purpose and that is compiled into code that can be loaded into a Checkpoint-specific firewall for customizing or updating standard filtering features of such firewall. The language in which such custom-coded packet inspection features are created is a very low-level language, which necessitated programs providing such custom-coded packet inspection features being fully or at least partially written by hand. However, to achieve more than a very basic level of protocol validation requires a large program that is difficult to validate for correctness.

SUMMARY OF THE DISCLOSURE

In one embodiment of the present invention, a method comprises receiving a binary data structure including a portion representing a protocol validation specification expressed in a respective protocol validation specification language and for receiving a security policy rule having an action part specifying that the binary data structure is to be used for verifying that application protocol payload of network packets complies with the protocol validation specification. The method further comprises verifying that application protocol payload of received network packets complies with the protocol validation specification. Such verifying is initiated in response to determining that the security policy rule applies to the received network packets and such verifying includes validating the application protocol payload of the received network packets against the binary data structure to confirm that the payload is what it is purported to be.

In another embodiment of the present invention, a method comprises transforming a protocol validation specification from a text format to a binary format thereby creating a binary-format representation of the protocol validation specification representing the protocol validation specification expressed in a respective protocol validation specification language. The method further comprises creating a binary data structure including the binary-format representation of the protocol validation specification and a validation code indicator corresponding to validation code intended to be used for validating application protocol payload against the binary-format representation of the protocol validation specification. The method further comprises providing the binary data structure to a network interface protection apparatus such that application protocol payload of network packets received by the network interface protection apparatus can be validated against the portion of the binary data structure representing the protocol validation specification to verify that the application protocol payload of the received network packets complies with the protocol validation specification.

In another embodiment of the present invention, an apparatus comprises memory, at least one data processing device coupled to the memory, and instructions accessible from the memory by the at least one data processing device. The instructions are configured for causing the at least one data processing device to carry out operations for receiving a binary data structure including a portion representing a protocol validation specification expressed in a respective protocol validation specification language, for receiving a security policy rule having an action part specifying that the binary data structure is to be used for verifying that application protocol payload of network packets complies with the protocol validation specification, and for verifying that application protocol payload of received network packets complies with the protocol validation specification. Such verifying is initiated in response to determining that the security policy rule applies to the received network packets and such verifying includes validating the application protocol payload of the received network packets against the binary data structure to confirm that the payload is what it is purported to be.

In another embodiment of the present invention, an apparatus comprises memory, at least one data processing device coupled to the memory, and instructions accessible from the memory by the at least one data processing device. The instructions are configured for causing the at least one data processing device to carry out operations for transforming a protocol validation specification from a text format to a binary format thereby creating a binary-format representation of the protocol validation specification representing the protocol validation specification expressed in a respective protocol validation specification language, for creating a binary data structure including the binary-format representation of the protocol validation specification and a validation code indicator corresponding to validation code intended to be used for validating application protocol payload against the binary-format representation of the protocol validation specification, and for providing the binary data structure to a network interface protection apparatus such that application protocol payload of network packets received by the network interface protection apparatus can be validated against the portion of the binary data structure representing the protocol validation specification to verify that the application protocol payload of the received network packets complies with the protocol validation specification.

In another embodiment of the present invention, a computer-readable medium has tangibly embodied thereon and accessible therefrom a set of instructions interpretable by at least one data processing device. The set of instructions is configured for causing the at least one data processing device to carry out operations for receiving a binary data structure including a portion representing a protocol validation specification expressed in a respective protocol validation specification language, for receiving a security policy rule having an action part specifying that the binary data structure is to be used for verifying that application protocol payload of network packets complies with the protocol validation specification, and for verifying that application protocol payload of received network packets complies with the protocol validation specification after receiving the binary data structure and the security policy rule. Such verifying is initiated in response to determining that the security policy rule applies to the received network packets and such verifying includes validating the application protocol payload of the received network packets against the binary data structure.

In another embodiment of the present invention, a computer-readable medium has tangibly embodied thereon and accessible therefrom a set of instructions interpretable by at least one data processing device. The set of instructions is configured for causing the at least one data processing device to carry out operations for transforming a protocol validation specification from a text format to a binary format thereby creating a binary-format representation of the protocol validation specification representing the protocol validation specification expressed in a respective protocol validation specification language, for creating a binary data structure including the binary-format representation of the protocol validation specification and a validation code indicator corresponding to validation code intended to be used for validating application protocol payload against the binary-format representation of the protocol validation specification, and for providing the binary data structure to a network interface protection apparatus such that application protocol payload of network packets received by the network interface protection apparatus can be validated against the portion of the binary data structure representing the protocol validation specification to verify that the application protocol payload of the received network packets complies with the protocol validation specification.

These and other embodiments of the present invention will become readily apparent upon further review of the following specification, associated drawings and appended claims.

BRIEF DESCRIPTION OF THE DRAWINGS

Some embodiments of apparatus and/or methods in accordance with embodiments of the present invention are now described, by way of example only, and with reference to the accompanying drawings, in which.

DESCRIPTION OF EMBODIMENTS

In view of the abovementioned shift in focus of network attacks from denial of service to system compromise and the increase in the sophistication and success of attacks against application layer protocols, there is a pressing need for flexible, complete, and rapidly deployable application layer protocol validation in firewall and intrusion detection and prevention systems. Advantageously, embodiments of the present invention are configured for providing such for flexible, complete, and rapidly deployable application layer protocol validation in firewall and intrusion detection and prevention systems. More specifically, embodiments of the present invention provide protocol validation that can be comprehensively and flexibly tailored and finely targeted and that can be quickly updated and deployed within such firewall and intrusion detection and prevention systems. To this end, embodiments of the present invention provide validation data structures that are generated from the official specifications of application layer protocol, thereby guaranteeing the correctness and completeness of such protocol validation. The specifications of application layer protocol are in a highly readable, high-level language and can be reliably modified to provide customized handling of the protocol(s) for subsets of filtered traffic passing through a firewall.

Embodiments of the present invention leverage protocol validation approaches that generate data structures from protocol validation specifications. It is disclosed herein that a protocol validation specification is sometimes also referred to as more simply a protocol specification. Preferably, but not necessarily such data structures are in a binary format. Validation code, which is configured to interpret these data structures, is implemented within a network interface protection apparatus to which the data structures are loaded. A firewall and an intrusion detection system (IDS) are examples of a network interface protection apparatus, which typically operate on server hardware. The validation code is configured for validating application protocol payload of network packets received by the network interface protection apparatus against a portion of the data structure representing the protocol validation specification to confirm that the payload is what it is purported to be.

The protocol validation specifications represent a policy language that allows the resulting data structures (i.e., validation filters) to be associated with rules for the network interface protection apparatus or with the service definition groups used to express such rules. The action(s) to be performed upon the detection of a violation of the protocol are specified for each rule or service group entry with which the filtering action is associated and can include dropping the current packet, termination of the information communication session, logging of the event, activation of tracking for the associated packet source address, and proactive control, such as redirection or throttling of the information communication session and subsequent information communication sessions from the particular endpoint. In this manner, embodiments of the present invention are configured to verify that the application protocol payload of the received network packets complies with the protocol validation specification.

The data structures that guide the packet inspection are loaded at runtime as named and typed entities. Multiple versions of these data structures for the same protocol validation specification can be generated from modifications of the original protocol validation specification and loaded and operated simultaneously within the same firewall to customize the handling of traffic for different subsets of filtered traffic. Multiple types of protocol representation can be supported by incorporating an interpretation code for each type of representation. This approach accommodates different classes of application protocol whose specifications are expressed in different languages. Examples of such different specification languages include, but are not limited to, Augmented Backus-Naur Form (ABNF) and Abstract Syntax Notation One (ASN.1). It is disclosed herein that the format of data structures in accordance with the present invention can be dependent upon the protocol validation specification that it represents. For example, a data structure that is generated from a protocol validation specification configured in accordance with ASN.1 will be different and said validation code will be somewhat more complicated than the data structure and the validation code associated with a protocol validation specification configured in accordance with ABNF.

Each data structure includes a portion that represents the protocol validation specification and a portion that indicates a validation code to be used for validating application protocol payload against the portion of the data structure that represents the protocol validation specification. The data structure is loaded to a network interface protection apparatus at runtime, thereby allowing a simple means for providing the network interface protection apparatus with an updated or different data structure. The validation code is a hard-coded component of the network interface protection apparatus. In some embodiments of the present invention, the network interface protection apparatus includes provisions for allowing updating, modifying, and/or adding validation codes.

Each protocol validation specification and associated validation code (i.e., engine) has respective characteristics that influence their operability and utility. Validation code characteristics and protocol validation specification characteristics can each be derived from information relating to the need to support protocol messages that are split across packet boundaries, need for protocol messages be reassembled before validation, need to forward packets while message is being assembled, need to support dropping of individual packets of an information communication session, need to re-synchronize validation of a information communication session after a violation has been detected, and the like. In view of the disclosures made herein, a skilled person will appreciate other information from which such characteristics can be derived. Furthermore, the present invention is not unnecessarily limited to specific types or categories of information from which such characteristics can be derived.

Figure 1:
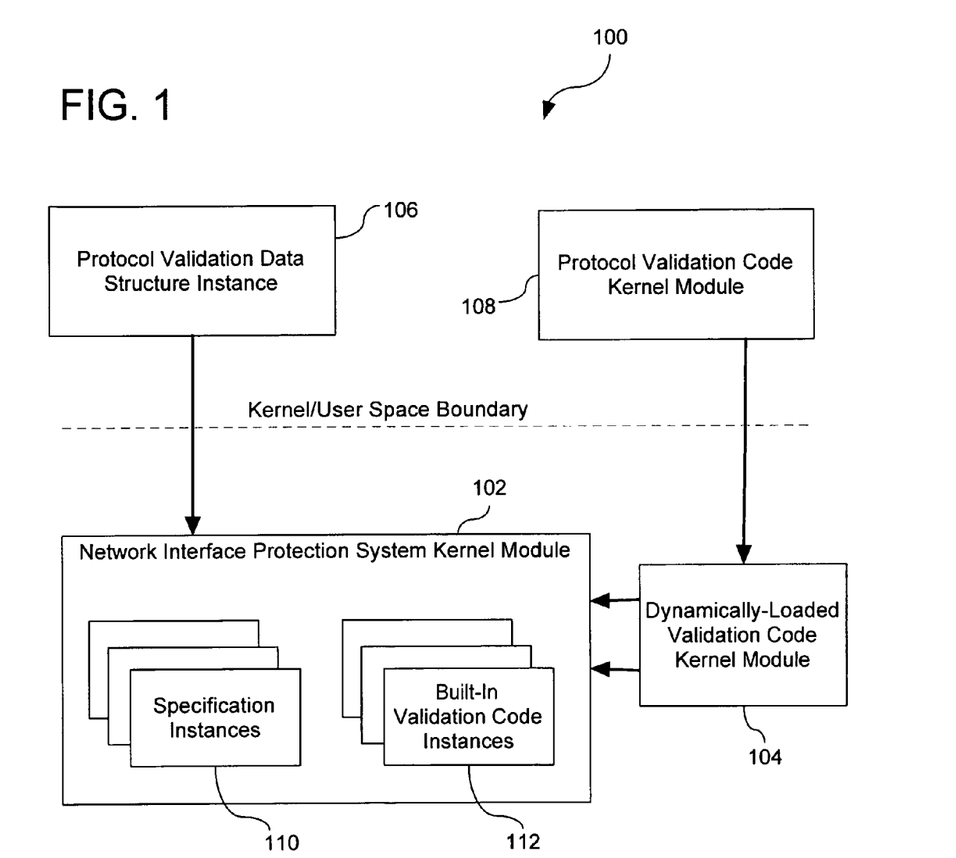
FIG. 1 shows a diagrammatic representation of a run-time extension for a Solaris kernel environment configured for supporting protocol validation in accordance with the present invention.

FIG. 1 shows a diagrammatic representation of a run-time extension for a Solaris kernel environment (i.e., environment 100) configured for supporting protocol validation in accordance with the present invention. The environment 100 includes a network interface protection apparatus kernel module 102, a dynamically loaded validation code kernel module 104, a protocol validation data structure instance 106, and a protocol validation code kernel module 108. The network interface protection apparatus kernel module 102 includes one or more protocol validation specifications 110 and one or more validation code instances 112.

A device driver (e.g., ioctl call/message driver) can provide for information being transmitted from the protocol validation data structure instance 106 to the network interface protection apparatus kernel module 102. Similarly, a driver can provide can provide for information being transmitted from the protocol validation code kernel module 108 to the dynamically loaded validation code kernel module 104. The dynamically-loaded validation code kernel module 104 registers with the network interface protection apparatus kernel module 102 and is configured for providing functionality to allow dynamically loaded (i.e., non-built-in) validation code instances to be loaded onto the network interface protection apparatus kernel module 102, thereby allowing for expanding features of validation capability with the data structures. To this end, the network interface protection apparatus kernel module 102 and the dynamically loaded validation code kernel module 104 jointly resolve symbol references for such dynamically loaded validation code instances.

At least one of the validation code instances 112 corresponds to a built-in validation code and one or more of the validation code instances 112 can correspond to a dynamically loaded validation code. Built-in refers to being hard-coded into the network interface protection apparatus kernel module 102 and dynamically loaded refers to being loaded at run-time. The protocol validation data structure instance 106 includes a binary representation of a corresponding one of the protocol validation specifications 110 and an indicator designating which one of the validation code instances corresponds to such corresponding protocol validation specification 110. Each specification instance 110 identifies a corresponding one of the validation code instances 112 by a descriptor (e.g., a name) given to the corresponding validation code.

Figure 2:
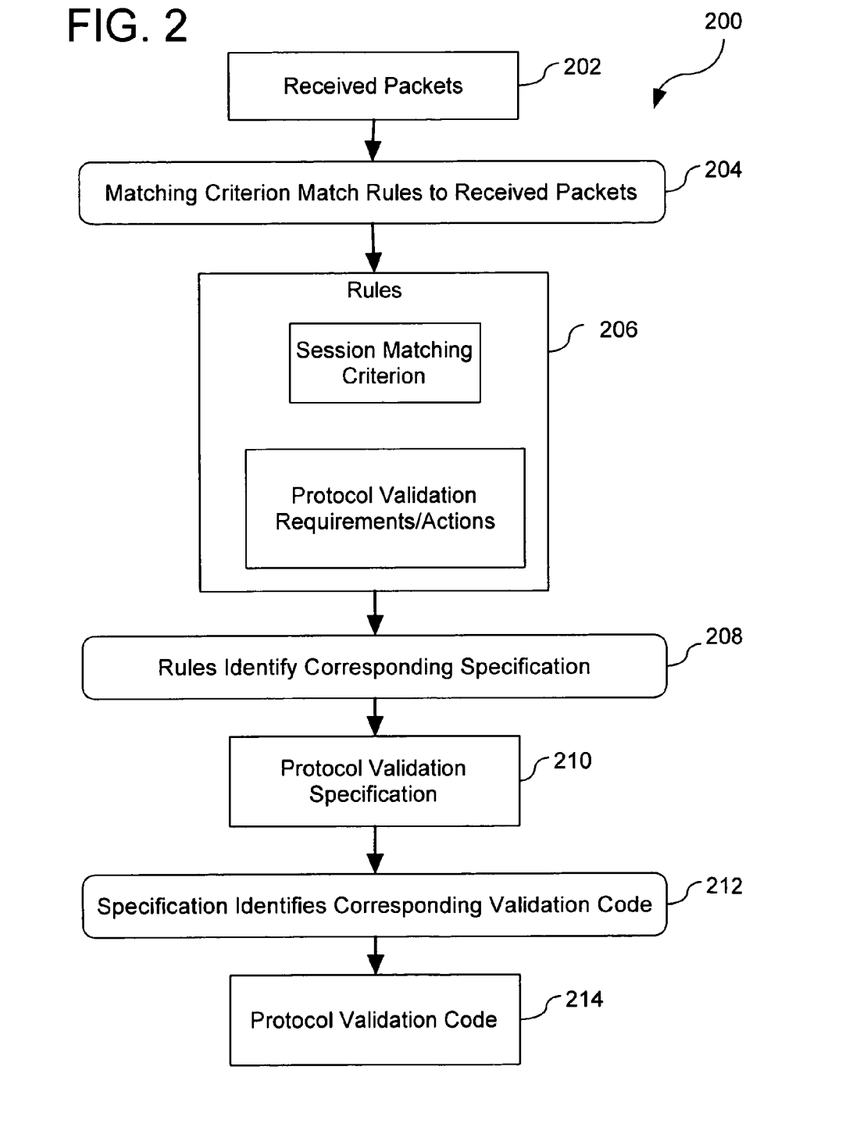
FIG. 2 shows a diagrammatic representation of a rule definition approach configured for supporting protocol validation in accordance with the present invention.

FIG. 2 is a diagrammatic representation of a rule definition approach 200 configured for supporting protocol validation in accordance with the present invention. Matching criterion of received packets 202 (e.g., Internet packets) are matched, at block 204, to one or more rules 206 associated with such received packets 202. Each rule 206 includes matching criterion by which matching to received packets is based and for actions/requirements that are to be implemented when a received packet is match to such match criterion. After a rule 206 is matched to a received packet, the rule 206 is used to identify, at block 208, a corresponding protocol validation specification 210. Thereafter, the corresponding protocol validation specification 210 is used to identify, at block 212, a corresponding protocol validation code 214 that is configured to validating application protocol payload of such packets against a binary representation of the corresponding protocol validation specification 210.

As can be seen, a rule matched by a new Internet (i.e., information communication) session identifies the required protocol validation specification. It is disclosed herein that more than one protocol validation specification can be provided for a particular protocol to allow different handling of the protocol depending upon the matched rule. A network interface protection apparatus (e.g., a firewall or intrusion detection system) can support multiple validation/transformation engines as required by the language with which the protocol and constraints are specified. For example, protocols specified using ABNF will generally use a different engine from protocols with an ASN.1 specification.

The protocol validation specification defines constraints on the protocol, the required transformations to the messages of the protocol, and the possible actions that can be taken on the packet or session in the event that the constraints are not met. The associated rule specifies which actions are operative from this list of possible actions. The session state is updated by the protocol validation code to maintain the state required for correct handling of subsequent packets of the Internet (i.e., information communication) session. Furthermore, the protocol validation code can be configured such that an event code and associated data are returned as the result of processing a packet. Examples of returned status include, but are not limited to, proposed action, event code, message offset, and packet offset. Examples of proposed action include, but are not limited to, pass packet, drop packet, and terminate session. Examples of validation session states include, but are not limited to, valid, re-synchronizing and session terminated.

As can be appreciated from the foregoing disclosure, embodiments of the present invention are configured for providing a flexible, complete, and rapidly deployable application layer protocol validation in a network interface protection apparatus (e.g., a firewall or intrusion detection and prevention system). More specifically, embodiments of the present invention provide protocol validation that can be comprehensively and flexibly tailored and finely targeted and that can be quickly updated and deployed within such network interface protection apparatus.

In implementation, embodiments of the present invention provide validation data structures (i.e., data structures) that are generated from an official protocol validation specification of an application layer protocol, thereby guaranteeing the correctness and completeness of such protocol validation. The specifications of application layer protocol are in a highly readable, high-level language and can be reliably modified to provide customized handling of the protocol(s) for subsets of filtered traffic passing through a firewall. Furthermore, updating of protocol validation in a network interface protection apparatus to address newly identified threats can be rapidly implemented through modification of the official protocol validation specification, transformation of such specification to a corresponding data structure, and loading of such data structure to the network interface protection apparatus.

Figure 3:
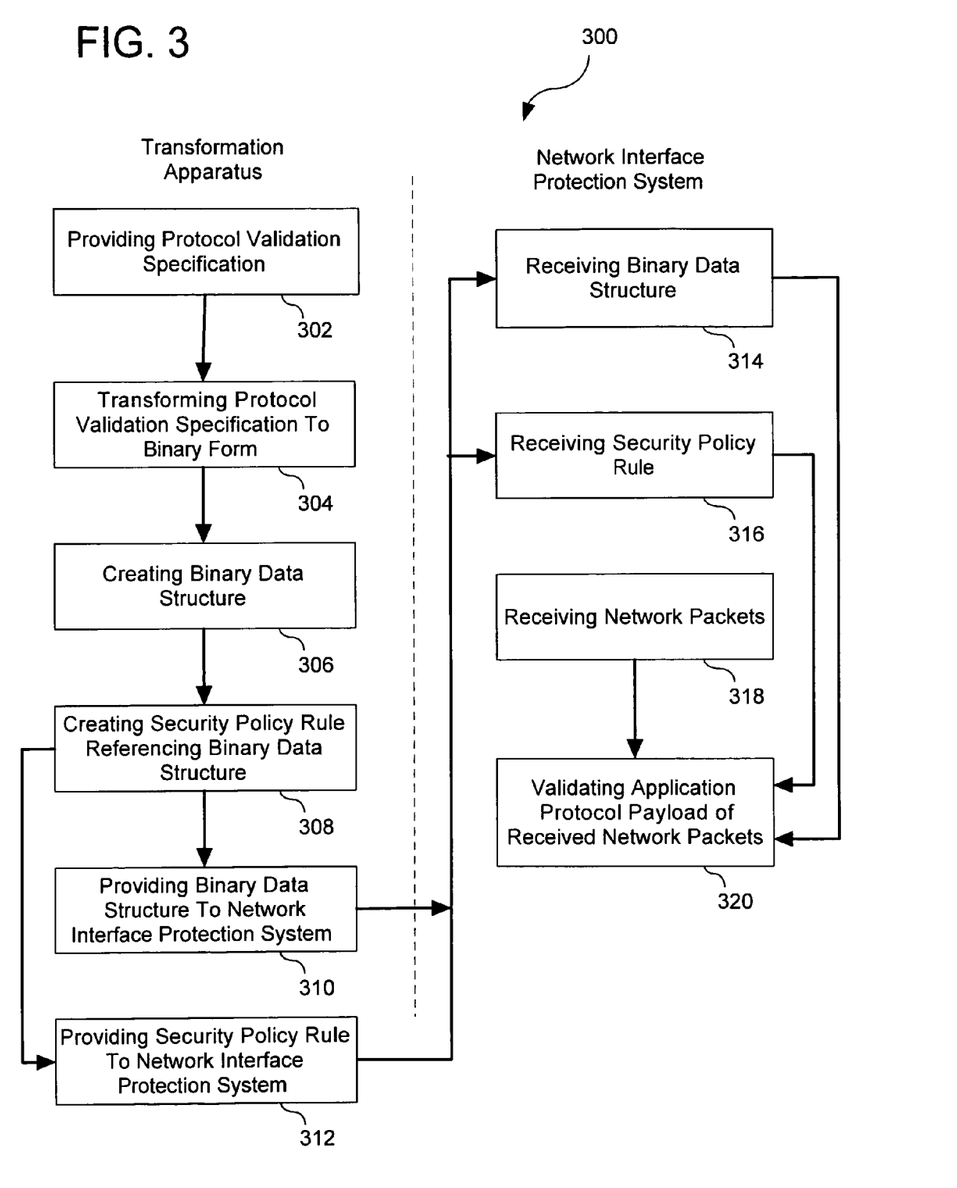
FIG. 3 shows a method configured in accordance with an embodiment of the present invention for validating that application protocol payload complies with a protocol validation specification.

Turning now to a discussion of specific aspects of carrying out protocol validation in accordance with the present invention, FIG. 3 shows a method 300 configured in accordance with an embodiment of the present invention for validating that application protocol payload complies with a protocol validation specification. ABNF will be used as the exemplary protocol specification language for this particular discussion. However, in view of the disclosures made herein, a skilled person will be given the motivation and enablement to implement such protocol validation functionality for other known and yet to be discovered protocol specification languages.

An operation 302 is performed for providing a protocol validation specification in a corresponding protocol specification language. As can be seen in the two following examples, protocol validation specifications can be written in different protocol specification languages. Example 1 shows a fragmentary portion of a Session Initiation Protocol (SIP) written in ABNF language. Example 2 shows a fragmentary portion of a Simple Network Management Protocol (SNMP) written in ASN.1 language.

EXAMPLE 1

Session Initiation Protocol (SIP) in ABNF Language

```
•
•
•
Via         = ( "Via" / "v" ) HCOLON via-parm *(COMMA via-parm)
```

-continued

```
via-parm        = sent-protocol LWS sent-by *( SEMI via-params )
via-params      = via-ttl / via-maddr
                / via-received / via-branch
                / via-extension
via-ttl         = "ttl" EQUAL ttl
via-maddr       = "maddr" EQUAL host
via-received    = "received" EQUAL (IPv4address / IPv6address)
via-branch      = "branch" EQUAL token
via-extension   = generic-param
sent-protocol   = protocol-name SLASH protocol-version
                    SLASH transport
protocol-name   = "SIP" / token
protocol-version = token
transport       = "UDP" / "TCP" / "TLS" / "SCTP"
                / other-transport
sent-by         = host [ COLON port ]
ttl             = 1*3DIGIT ; 0 to 255
Warning         = "Warning" HCOLON warning-value *(COMMA
warning-value)
warning-value = warn-code SP warn-agent SP warn-text
warn-code       = 3 DIGIT
warn-agent      = hostport / pseudonym
                ; the name or pseudonym of the server adding
                ; the Warning header, for use in debugging
warn-text       = quoted-string
pseudonym       = token
WWW-Authenticate = "WWW-Authenticate" HCOLON challenge
extension-header = header-name HCOLON header-value
•
•
•
```

EXAMPLE 2

Simple Network Management Protocol (SNMP) in ASN.1 Language

```
•
•
•
GetResponse-PDU ::=
    [2]
        IMPLICIT SEQUENCE {
            request-id
                RequestID,
            error-status
                ErrorStatus,
            error-index
                ErrorIndex,
            variable-bindings
                VarBindList
        }
•
•
•
```

Modifying a pre-existing (e.g., official version, previously modified version, etc.) of a protocol validation specification to include additional constraints is an example of providing a protocol validation specification (i.e., an enhanced protocol validation specification with respect to the pre-existing version). Such additional constraints can be added as XPath expressions. XPath (XML Path) language is a query language for selecting nodes from an XML document, is based on a tree representation of the XML document, and provides the ability to navigate around the tree for selecting nodes by a variety of criteria. Example 3 below shows an example of XPATH code configured to disambiguate SIP.

EXAMPLE 3

Xpath Code Configured to Disambiguate SIP

```
; Hackery to get RFC 3261 to generate an NFA.
not(//telephone-subscriber)
and not(//pname{ "transport" / "user" / "method" / "ttl" / "maddr" / "lr" })
and not(//srvr/user-unreserved{ "/" / "?" })
and not(//media-range/m-parameter)
and not(//accept-param/generic-param/token{ "q" })
and not(//dig-resp/auth-param/auth-param-name{ "username" / "realm" / "nonce" / "uri" /
"response" / "algorithm" / "cnonce" / "opaque" / "qop" / "nc" })
    and not(//auth-scheme{ "Digest" })
    and not(//infb-param/token{ "icon" / "info" / "card" })
    and not(//info-param/generic-param/token{ "purpose" })
    and not(//addr-spec/absoluteURI/scheme{ "sip" / "sips" })
    and not(//Request-URI/absoluteURI/scheme{ "sip" / "sips" })
    and not(//contact-extension/generic-param/token{ "q" / "expires" })
    and not(//other-handling{ "optional" / "required" })
    and not(//disp-extension-token{ "render" / "session" / "icon" / "alert" })
    and not(//ietf-token{ x-token / "message" / "multipart" })
    and not(//iana-token)
    and not(//from-spec/addr-spec{ *OCTET ( "," / "?" / ";" ) *OCTET })
    and not(//from-param/generic-param/token{ "tag" })
    and not(//digest-cln/auth-param/auth-param-name{ "realm" / "domain" / "nonce" / "opaque" /
"stale" / "algorithm" / "qop" })
    and not(//contact-param/addr-spec{ *OCTET ( "," / "?" / ";" ) *OCTET })
    and not(//To/addr-spec{ *OCTET ( "," / "?" / ";" ) *OCTET })
    and not(//rplyto-spec/addr-spec{ *OCTET ( "," / "?" / ";" ) *OCTET })
    and not(//to-param/generic-param/token{ "tag" })
    and not(//via-extension/generic-param/token{ "ttl" / "maddr" / "received" / "branch" })
    and not(//protocol-name/token{ "SIP" })
    and not(//comment/comment)
    and not(//extension-header/header-name{
        "Accept" / "Accept-Encoding" / "Accept-Language"
      / "Alert-Info" / "Allow" / "Authentication-Info" / "Authorization"
      / "Call-ID" / "Call-Info" / "Contact" / "Content-Disposition"
      / "Content-Encoding" / "Content-Language" / "Content-Length"
      / "Content-Type" / "CSeq" / "Date" / "Error-Info" / "Expires"
      / "From" / "In-Reply-To" / "Max-Forwards" / "MIME-Version"
      / "Min-Expires" / "Organization" / "Priority" / "Proxy-Authenticate"
      / "Proxy-Authorization" / "Proxy-Require" / "Record-Route"
      / "Reply-To" / "Require" / "Retry-After" / "Route"
      / "Server" / "Subject" / "Supported" / "Timestamp" / "To"
      / "Unsupported" / "User-Agent" / "Via" / "Warning" / "WWW-Authenticate"
      / "i" / "m" / "e" / "l" / "c" / "f" / "s" / "k" / "t" / "v"
    })
;                            dialog
;                  reg./redir. Contact/
;       default Req.-URI To From Contact R-R/Route external
;user         --  o o   o o  o  o
;password     --  o o o o  o  o
;host         --  m m m m  m  m
;port        (1) o  - -  o  o  o
;user-param   ip o  o o  o  o  o
;method       INVITE -  - - -  - o
;maddr-param --  o  - - o  o  o
;ttl-param    1 o  - -  o  -  o
;transp.-param (2)   o  - - o  o  o
;lr-param         --  o - - -  o  o
;other-param --  o  o o o  o  o
;headers       --  -  - -  o  -  o
;
and not(//To//port)
and not(//From//port)
and not(//Request-URI//method)
and not(//To//method)
and not(//From//method)
and not(//Contact//method)
and not(//Route//method)
```

After providing the protocol validation specification, an operation 304 is performed for transforming the protocol validation specification from a native format (e.g., textual format) to a binary format thereby creating a binary-format representation of the protocol validation specification. This binary format representation of the protocol validation specification represents the protocol validation specification expressed in a respective protocol validation specification language. For example, ABNF is a protocol validation language that is textual in its native format. Thus, it can be seen that the binary-format representation of the protocol validation specification is generated directly from an annotated (e.g., lightly-annotated) protocol validation specification.

Next, an operation 306 is performed for creating a binary data structure including the binary-format representation of the protocol validation specification and a validation code indicator. This binary data structure can also be referred to as a validator. In at least one embodiment of the present invention, such creating is a portion of transforming the protocol validation specification whereby such transformation includes embedding the validation code indicator within the binary-format representation of the protocol validation specification such that a single operation creates the binary data structure. Example 4 shows a fragmentary portion of C code that can be compiled to generate such a binary data structure, which is named "parse.h".

The validation code indicator corresponds to (i.e., provides an indication of) a validation code intended for use in validating application protocol payload against the binary-format representation of the protocol validation specification. The validation code is configured for validating application protocol payload against the portion of the binary data structure representing the protocol validation specification. More specifically, the validation code is configured in accordance with the respective protocol validation specification language of the protocol validation specification.

EXAMPLE 4

C Code Fragment to Generate Binary Data Structure

As can be seen, the binary data structure shown in Example 4 is in the form of an acyclic digraph. It is like a tree in which the branches may merge as they proceed towards the leaves. It is disclosed herein that a data structure in the form of a tree would provide the required functionality, but would require far greater storage. The binary data structure combines a start state and each ASCII character of the packet payload in sequence to reach a pass, fail, or continue outcome for each direction of the corresponding session communication.

The data structures are each assigned a unique name and are loaded at run-time as a component of a security policy of the network interface protection apparatus. They are applied to network traffic by being named within security policy rules of the network interface protection apparatus or by being associated with the entries of one or more service groups. Service groups are used in the matching specification for such security policy rules. The actions to be performed upon the detection of a violation of the protocol are specified for each rule or service group entry with which a filtering action is associated. Examples of such actions include, but are not limited to, dropping the current packet, termination of the information communication session, logging of the event, activation of tracking for the associated packet source address, and proactive control, such as redirection or throttling of the information communication session and subsequent information communication sessions from the particular endpoint.

A skilled person will appreciate and understand that a binary data structure configured in accordance with the present invention is pure, platform independent data that performs very comprehensive and accurate validation of network protocols directly against specifications. It can include

```
#include "parse.h"
    // Begin automaton sip
// typedef unsigned int sip_t;
sip_t sip_u[16331][16] = {
{0x1,0x1,0x1,0x1,0x1,0x1,0x1,0x1,0x1,0x1,0x1,0x1,0x1,0x1,0x1,0x1},
{0x1,0x1,0x1,0x1,0x1,0x1,0x1,0x1,0x1,0x1,0x1,0x1,0x1,0x1,0x1E,0x1},
{0x1,0x1,0x1,0x1,0x1,0x1,0x1,0x1,0x1,0x1,0x1,0x1,0x1,0x1,0x5E,0x1},
•
•
•
int sip_v[8754][16] = {
{1,1,54,54,54,54,54,54,54,54,54,54,54,54,54,54},
{2,14,19,19,19,21,24,19,24,19,25,26,53,53,53,53},
{3,3,6,6,7,6,7,8,10,11,12,7,7,3,7,3},
{4,4,5,4,4,4,4,4,4,4,4,4,4,4,4,4},
•
•
•
int sip_w[256] = {
0,55,55,55,55,55,55,55,55,94,509,679,702,725,1253,1253,1253,1253,1253,1253,1253,1253,
1253,1253,1253,1253,1253,1253,1253,1253,1253,1253,1276,1413,1687,1859,1889,1931,2053,
1413,2075,2099,2113,2142,2204,2436,2595,2757,2847,3073,3118,3154,3178,3196,3232,
3260,3272,3277,3282,3446,3642,3700,3822,3882,3952,4032,4250,4356,4472,4576,4689,4760,
4910,4989,5113,5162,5215,5311,5389,5493,5611,5706,5751,5880,6011,6122,6227,6287,
6312,6343,6390,6401,6487,6546,1859,1413,6624,6701,6871,6956,7050,7131,7230,7259,7385,
7453,7538,7563,7601,7691,7774,7849,7940,8030,8062,8154,8257,8371,8443,8470,8484,
8497,8509,8522,1859,8522,1413,1253,8525,8525,8525,8525,8525,8525,8525,8525,8525,
8525,8525,8525,8525,8525,8525,8525,8525,8525,8525,8525,8525,8525,8525,8525,
8525,8525,8525,8525,8525,8525,8525,8525,8525,8525,8525,8525,8525,8525,8525,8525,
8525,8525,8525,8525,8525,8525,8525,8525,8525,8525,8525,8525,8525,8525,8525,
8525,8525,8525,8525,8525,8562,8562,8562,8562,8562,8562,8562,8562,8562,8562,8562,
8562,8562,8562,8562,8562,8562,8562,8562,8562,8562,8562,8562,8562,8562,
8562,8562,8562,8562,8600,8600,8600,8600,8600,8600,8600,8600,8600,8600,8600,8600,
8600,8600,8600,8638,8638,8638,8638,8638,8638,8638,8638,8676,8676,8676,8676,8714,
8714,8752,8752
    };
``` a very small amount of annotation required to resolve ambiguities in the corresponding protocol validation specification. Its binary format allows it to be generated rapidly from the corresponding protocol validation specification to respond to new protocol attack scenarios and to enforce additional restrictions on the protocol as required. As can be seen in the above example, such a binary data structure includes a relatively large (e.g. 2 Mbytes) but shallow (e.g., four levels) acyclic data structure that is applied to the packet payload using a very few lines of code (e.g., C-language code as illustrated in Example 5). Thus, a binary data structure configured in accordance with the present invention has a large memory footprint for data, but runtime overhead is relatively low with predictable latency.

During or after creating the binary data structure, an operation 308 is performed for creating a security policy rule having an action part specifying that the binary data structure is to be used for verifying that application protocol payload of network packets complies with the protocol validation specification. Rules specify a condition for matching and actions to be taken if a match is made. Typically, matches are made to a 5-tuple pattern of source and destination IP address, IP protocol (e.g. TCP), and source and destination port (or some similar fields for ICMP and the like). Wild-card indicators can be used in a field to mean match any one of a plurality of parameters, and ranges or lists can be used for IP addresses. A service group is a list of tuples of IP protocol (UDP, TCP, . . . ) with transport layer source and destination "port numbers" or port ranges (e.g. TCP port 80, UDP port range 5000-5100, . . . ). These are used to match incoming packets to security policy rules. For each entry of the list, special processing can be specified for the application layer. For example, if an entry specifies TCP and destination port 80, it might be specified that URL filtering, HTTP protocol validation, or both be performed. Service groups can be used in place of the IP protocol, and source and destination field three-tuple. Typically, the source port number in the pattern is a wild card in a state-keeping firewall. So, for example, to match HTTP (i.e., information communication) sessions, we specify <TCP, *, 80> which translates to match TCP packets with any source port and with destination port 80. The actions to be performed upon the detection of a violation of the protocol are specified for each rule or service group entry with which the filtering action is associated and can include dropping the current packet, termination of the information communication session, logging of the event, activation of tracking for the associated packet source address, and proactive control, such as redirection or throttling of the information communication session and subsequent information communication sessions from the particular endpoint. Such actions are prior art for firewall rule matching behaviour.

After creating the binary data structure, an operation 310 is performed for providing (e.g., transmitting, downloading, uploading, etc) the binary data structure to a network interface protection apparatus such that application protocol payload of network packets received by the network interface protection apparatus can be validated against the portion of the binary data structure representing the protocol validation specification. Similarly, an operation 312 is performed for providing the security policy rule to the network interface protection apparatus. In this manner, the operations of the method 300 performed thus far enable verification that application protocol payload of received network packets of the network interface protection apparatus comply with the protocol validation specification.

It is disclosed herein that the operations for providing the protocol validation specification, transforming the protocol validation specification, creating a binary data structure, creating the security policy rule, and providing the binary data structure to the network interface protection apparatus can be performed by a single data computing apparatus or by two or more data processing apparatuses. For example, all of such operations can be performed using a single data processing apparatus such as a workstation, server or the like. Alternatively, two or more of the operations can be performed by different data processing apparatuses. The present invention is not unnecessarily limited to any particular configuration of apparatuses utilized for performing such operations.

In conjunction with and/or in response to providing the binary data structure and security rule to the network interface protection apparatus, the network interface protection apparatus performs an operation 314 for receiving the binary data structure and an operation 316 for receiving the security policy rule. As disclosed above, the binary data structure includes a portion representing a protocol validation specification and a portion indicating a validation code to use for validating application protocol payload against the binary data structure. It has also been disclosed that the security policy rule has an action part specifying that the binary data structure is to be used for verifying that application protocol payload of network packets complies with the protocol validation specification.

An example of such validation code is shown in FIG. 5. A skilled person will appreciate that the validation code is relatively small in size. This is because the binary data structure has a relatively simple coded-form.

EXAMPLE 5

Validation Code

```
const sip_t sip_q0 = 0x512;
const sip_t sip_q1 = 0x513;
const unsigned int sip_m - 0x1;
int sip_sink(sip_t q) {
    return (q == sip_q1);
}
int sip_accept(sip_t q) {
    return (q & 0x1 == 0x1) && !sip_sink(q);
}
sip_t sip_init( ) {
    return sip_q0;
}
sip_t sip_next(sip_t q, char c) {
    int v0 = sip_w[c & 0xFF];
    int v1 = sip_v[v0][(q >> 20) & 0xF];
    int v2 = sip_v[v1][(q >> 16) & 0xF];
    int v3 = sip_v[v2][(q >> 12) & 0xF];
    int v4 = sip_v[v3][(q >> 8) & 0xF];
    int v5 = sip_v[v4][(q >> 4) & 0xF];
    sip_t u = sip_u[v5][q & 0xF];
    sip_t r = q  u;
    return (u == sip_m? sip_q1 : r);
}
char *sip_drop(sip_t *state, char *s, int len) {
    sip_t q = *state;
    for(; len; s++,len--) {
        q = sip_next(q,*s);
        if (sip_sink(q)) { *state = q; return s; }
    }
    *state = q; return 0;
}
```

After receiving the binary data structure and the security policy rule and in conjunction with performing an operation 318 for receiving network packets, the network interface protection apparatus performs an operation 320 for validating that application protocol payload of received network packets for verifying that it complies with the protocol validation specification. Such verifying is initiated in response to determining that the security policy rule applies to received network packets carrying the application protocol payload (i.e., rule-matching packets) and includes validating the application protocol payload of such rule-matching packets against the binary data structure using the indicated validation code.

Session states are maintained on a per-session basis. The session state from a current packet (i.e., payload thereof currently being validated) is saved in a session record for use as starting state by a next packet to be validated (i.e., state value updated on a per-packet basis within a session). Matching for rules takes place for first packet of payload in the session record. In this manner, rules mapping is done for first packet, which is recorded on state record for session and the validation code can store session state for each packet. Examples of session states include, but are not limited to valid, validation-failed-but-resynchronizing, and validation-failed-cannot-resynchronize.

As disclosed above, the specific specification protocol language will dictate the specific manner in which validation code and corresponding binary data structure will be implemented. For example, when a protocol validation specification language of the application protocol payload is formatted in accordance with ABNF, verifying the application protocol payload of the received network packets includes validating the application protocol payload of the received network packets against the portion of the binary data structure representing the protocol validation specification on a character-by-character basis. Alternatively, when a protocol validation specification language of the application protocol payload is formatted in accordance with ASN.1, verifying the application protocol payload of the received network packets includes validating the application protocol payload of a plurality of received network packets as a single unit of information (i.e., payload of a plurality of packets validated after being aggregated). Preferably, but not necessarily, a validation code instance in accordance with the present invention does not have array dimensions of the binary data structure coded therein, thereby allowing the engine to be more generalized in implementation.

Figure 4:
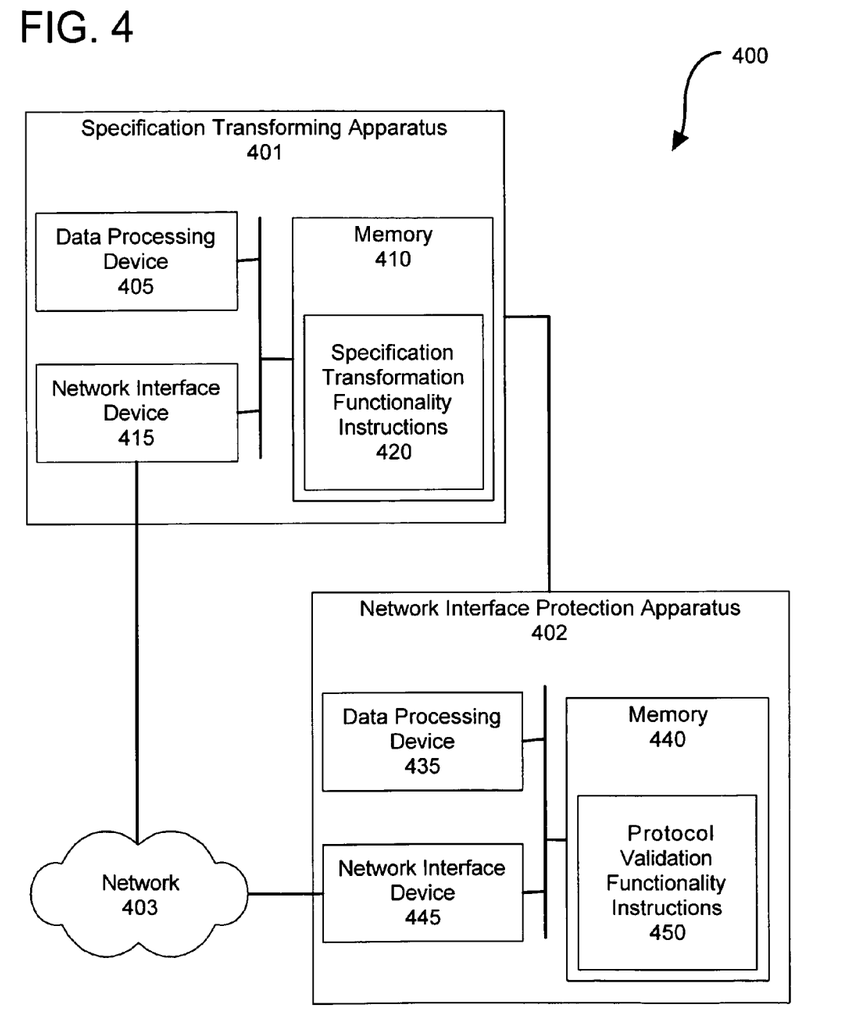
FIG. 4 shows an embodiment of an exemplary protocol validation system configured in accordance with the present invention.

Referring now to FIG. 4, a protocol validation system configured in accordance with an exemplary embodiment of the present invention (i.e., the system 400) can carry out protocol validation functionality in accordance with the present invention (e.g., in accordance with the method 300). The system 400 includes a specification transforming apparatus 401 (e.g., a workstation) and a network interface protection apparatus 402 coupled to the specification transforming apparatus 401 through a network 403. The specification transforming apparatus 401 includes a data processing device 405, memory 410, and a network interface device 415. The data processing device 405, the memory 410 and the network interface device 415 are interconnected for enabling interaction therebetween. Residing in the memory 410 are instructions 420 for, among other functionality, carrying out specification transforming functionality in accordance with the present invention (e.g., as embodied in operations 302-312 of the method 300 disclosed herein). The instructions 420 are accessible from within the memory 410 and are processable by the data processing device 405. In this manner, the instructions 420 are configured for enabling the data processing device 405 to carryout specification transforming operations in accordance with the present invention. The network interface protection system 402 includes a data processing device 435, memory 440, and a network interface device 445. The data processing device 435, the memory 440 and the network interface device 445 are interconnected for enabling interaction therebetween. Residing in the memory 440 are instructions 450 for, among other functionality, carrying out specification validation functionality in accordance with the present invention (e.g., as embodied in operations 314-320 of the method 300 disclosed herein). The instructions 450 are accessible from within the memory 440 and are processable by the data processing device 435. In this manner, the instructions 450 are configured for enabling the data processing device 435 to carry out protocol validation operations in accordance with the present invention.

With respect to instructions processable by a data processing device, it will be understood from the disclosures made herein that methods, processes and/or operations adapted for carrying out application protocol validation functionality as disclosed herein are tangibly embodied by computer readable medium having instructions thereon that are configured for carrying out such functionality. In one specific embodiment, the instructions are tangibly embodied for carrying out the method 300 disclosed above. The instructions may be accessible by one or more data processing devices from a memory apparatus (e.g. RAM, ROM, virtual memory, hard drive memory, etc), from an apparatus readable by a drive unit of a data processing system (e.g., a diskette, a compact disk, a tape cartridge, etc) or both. Accordingly, embodiments of computer readable medium in accordance with the present invention include a compact disk, a hard drive, RAM or other type of storage apparatus that has imaged thereon a computer program (i.e., instructions) adapted for carrying out application protocol validation functionality in accordance with the present invention. In one example, a server having one or more data processing devices coupled to memory having such instructions stored thereon and accessible therefrom is an example of an apparatus configured for carrying out application protocol validation functionality in accordance with the present invention.

Thus, a person of skill in the art would readily recognize that operations (e.g., steps of various above-described methodology and/or functionality can be performed by one or more programmed computers (i.e., an apparatus). Herein, some embodiments are intended to cover program storage devices, e.g., digital data storage media, which are machine or computer readable and encode machine-executable or computer-executable programs of instructions where the instructions perform some or all of the operations of methods described herein. The program storage devices may be, e.g., digital memories, magnetic storage media such as a magnetic disks or tapes, hard drives, or optically readable digital data storage media. The embodiments are also intended to cover computers programmed to perform the operations of such methods described herein.

In the preceding detailed description, reference has been made to the accompanying drawings that form a part hereof, and in which are shown by way of illustration specific embodiments in which the present invention may be practiced. These embodiments, and certain variants thereof, have been described in sufficient detail to enable those skilled in the art to practice embodiments of the present invention. It is to be understood that other suitable embodiments may be utilized and that logical, mechanical, chemical and electrical changes may be made without departing from the spirit or scope of such inventive disclosures. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A method, comprising:
   receiving, by a network interface device within a network interface protection apparatus, a binary data structure including a portion representing a protocol validation specification expressed in a respective protocol validation specification language and another portion including a validation code indicator used to identify a validation code separate from the binary data structure;
   receiving, by the network interface device, a security policy rule separate from the binary data structure having an action part specifying that the binary data structure is to be used for verifying that application protocol payload of network packets complies with the protocol validation specification, the security policy rule further indicating actions to be performed upon detection of a violation of the protocol validation specification; and
   verifying, by a data processing device within the network interface apparatus, that application protocol payload of received network packets complies with the protocol validation specification, wherein said verifying is initiated in response to determining that the security policy rule applies to said received network packets and wherein said verifying includes validating said application protocol payload of said received network packets against the binary data structure using the validation code.

2. The method of claim 1, further comprising:
   transforming the protocol validation specification from a text format to a binary format thereby providing a binary-format representation of the protocol validation specification; and
   creating the binary data structure, wherein the binary data structure includes the binary-format representation of the protocol validation specification.

3. The method of claim 1 wherein verifying said application protocol payload of said received network packets includes validating said application protocol payload of said received network packets against the portion of the binary data structure representing the protocol validation specification on a character-by-character basis.

4. The method of claim 3, further comprising:
   transforming the protocol validation specification from a text format to a binary format for creating the portion of the binary data structure representing the protocol validation specification prior to receiving the binary data structure.

5. The method of claim 1 wherein receiving the binary data structure and the security policy rule includes loading the security policy rule and the binary data structure at run-time of a security policy instantiation.

6. A method, comprising:
   transforming, by a data processing device within a specification transforming apparatus, a protocol validation specification from a text format to a binary format thereby creating a binary-format representation of the protocol validation specification representing the protocol validation specification expressed in a respective protocol validation specification language;
   creating, by the data processing device, a binary data structure including the binary-format representation of the protocol validation specification and a validation code indicator used to identify a validation code separate from the binary data structure and intended to be used for validating application protocol payload against the binary-format representation of the protocol validation specification; and
   providing, by a network interface device within the specification transforming apparatus, the binary data structure to a network interface protection apparatus to validate application protocol payload of network packets received by the network interface protection apparatus against the portion of the binary data structure representing the protocol validation specification using the validation code to verify that said application protocol payload of said received network packets complies with the protocol validation specification;
   wherein the network interface protection apparatus further receives a security policy rule separate from the binary data structure having an action part specifying that the binary data structure is to be used for verifying that application protocol payload of network packets complies with the protocol validation specification, the security policy rule further indicating actions to be performed upon detection of a violation of the protocol validation specification.

7. The method of claim 6 wherein said validation code is configured in accordance with the respective protocol validation specification language of the protocol validation specification.

8. An apparatus, comprising:
   memory;
   at least one data processing device coupled to said memory; and
   instructions accessible from said memory by said at least one data processing device, wherein said instructions are configured for causing said at least one data processing device to carry out operations for:
     receiving a binary data structure including a portion representing a protocol validation specification expressed in a respective protocol validation specification language and another portion including a validation code indicator used to identify a validation code separate from the binary data structure;
     receiving a security policy rule separate from the binary data structure and having an action part specifying that the binary data structure is to be used for verifying that application protocol payload of network packets complies with the protocol validation specification, the security policy rule further indicating actions to be performed upon detection of a violation of the protocol validation specification; and
     verifying that application protocol payload of received network packets complies with the protocol validation specification, wherein said verifying is initiated in response to determining that the security policy rule applies to said received network packets and wherein said verifying includes validating said application protocol payload of said received network packets against the binary data structure using the validation code.

9. The apparatus of claim 8 wherein the validation code is configured for interpreting the binary data structure.

10. The apparatus of claim 8 wherein said instructions are further configured for causing said at least one data processing device to carry out operations for:
    receiving the validation code configured for validating application protocol payload against the portion of the binary data structure representing the protocol validation specification, wherein verifying that said application protocol payload of received network packets complies with the protocol validation specification includes said validation code using the binary data structure to validate said application protocol payload of said received network packets against the portion of the binary data structure representing the protocol validation specification.

11. The apparatus of claim 8 wherein said instructions are further configured for causing said at least one data processing device to carry out operations for:
   transforming the protocol validation specification from a text format to a binary format thereby providing a binary-format representation of the protocol validation specification; and
   creating the binary data structure, wherein the binary data structure includes the binary-format representation of the protocol validation specification.

12. The apparatus of claim 8 wherein said validation code is configured in accordance with the respective protocol validation specification language of the protocol validation specification.

13. The apparatus of claim 8 wherein verifying said application protocol payload of said received network packets includes validating said application protocol payload of said received network packets against the portion of the binary data structure representing the protocol validation specification on a character-by-character basis.

14. The apparatus of claim 13 wherein said instructions are further configured for causing said at least one data processing device to carry out operations for:
   transforming the protocol validation specification from a text format to a binary format for creating the portion of the binary data structure representing the protocol validation specification prior to receiving the binary data structure.

15. The apparatus of claim 8 wherein receiving the binary data structure and the security policy rule includes loading the security policy rule and the binary data structure at run-time of a security policy instantiation.

16. An apparatus, comprising:
   memory;
   at least one data processing device coupled to said memory; and
   instructions accessible from said memory by said at least one data processing device, wherein said instructions are configured for causing said at least one data processing device to carry out operations for:
      transforming a protocol validation specification from a text format to a binary format thereby creating a binary-format representation of the protocol validation specification representing the protocol validation specification expressed in a respective protocol validation specification language;
      creating a binary data structure including the binary-format representation of the protocol validation specification and a validation code indicator used to identify a validation code separate from the binary data structure and intended to be used for validating application protocol payload against the binary-format representation of the protocol validation specification; and
      providing the binary data structure to a network interface protection apparatus to validate application protocol payload of network packets received by the network interface protection apparatus against the portion of the binary data structure representing the protocol validation specification using the validation code to verify that said application protocol payload of said received network packets complies with the protocol validation specification;
   wherein the network interface protection apparatus further receives a security policy rule separate from the binary data structure having an action part specifying that the binary data structure is to be used for verifying that application protocol payload of network packets complies with the protocol validation specification, the security policy rule further indicating actions to be performed upon detection of a violation of the protocol validation specification.

17. The apparatus of claim 16 wherein said validation code is configured in accordance with the respective protocol validation specification language of the protocol validation specification.

18. A non-transitory computer-readable medium having tangibly embodied thereon and accessible therefrom a set of instructions interpretable by at least one data processing device, said set of instructions configured for causing said at least one data processing device to carry out operations for:
   receiving a binary data structure including a portion representing a protocol validation specification expressed in a respective protocol validation specification language and another portion including a validation code indicator used to identify a validation code separate from the binary data structure;
   receiving a security policy rule separate from the binary data structure and having an action part specifying that the binary data structure is to be used for verifying that application protocol payload of network packets complies with the protocol validation specification, the security policy rule further indicating actions to be performed upon detection of a violation of the protocol validation specification; and
   verifying that application protocol payload of received network packets complies with the protocol validation specification, wherein said verifying is initiated in response to determining that the security policy rule applies to said received network packets and wherein said verifying includes validating said application protocol payload of said received network packets against the binary data structure using the validation code.

19. The computer-readable medium of claim 18 wherein the validation code is configured for interpreting the binary data structure.

20. The computer-readable medium of claim 18 said set of instructions configured for causing said at least one data processing device to carry out operations for:
   Receiving the validation code configured for validating application protocol payload against the portion of the binary data structure representing the protocol validation specification, wherein verifying that said application protocol payload of received network packets complies with the protocol validation specification includes said validation code using the binary data structure to validate said application protocol payload of said received network packets against the portion of the binary data structure representing the protocol validation specification.

21. The computer-readable medium of claim 18 said set of instructions configured for causing said at least one data processing device to carry out operations for:
   transforming the protocol validation specification from a text format to a binary format thereby providing a binary-format representation of the protocol validation specification; and creating the binary data structure, wherein the binary data structure includes the binary-format representation of the protocol validation specification.

22. The computer-readable medium of claim 18 wherein said validation code is configured in accordance with the respective protocol validation specification language of the protocol validation specification.

23. The computer-readable medium of claim 18 wherein verifying said application protocol payload of said received network packet includes validating said application protocol payload of said received network packets against the portion of the binary data structure representing the protocol validation specification on a character-by-character basis.

24. The computer-readable medium of claim 23 said set of instructions configured for causing said at least one data processing device to carry out operations for:
transforming the protocol validation specification from a text format to a binary format for creating the portion of the binary data structure representing the protocol validation specification prior to receiving the binary data structure.

25. The computer-readable medium of claim 18 wherein receiving the binary data structure and the security policy rule includes loading the security policy rule and the binary data structure at run-time of a security policy instantiation.

26. A non-transitory computer-readable medium having tangibly embodied thereon and accessible therefrom a set of instructions interpretable by at least one data processing device, said set of instructions configured for causing said at least one data processing device to carry out operations for:
transforming a protocol validation specification from a text format to a binary format thereby creating a binary-format representation of the protocol validation specification representing the protocol validation specification expressed in a respective protocol validation specification language;
creating a binary data structure including the binary-format representation of the protocol validation specification and a validation code indicator used to identify a validation code separate from the binary data structure and intended to be used for validating application protocol payload against the binary-format representation of the protocol validation specification; and
providing the binary data structure to a network interface protection apparatus to validate application protocol payload of network packets received by the network interface protection apparatus against the portion of the binary data structure representing the protocol validation specification using the validation code to verify that said application protocol payload of said received network packets complies with the protocol validation specification;
wherein the network interface protection apparatus further receives a security policy rule separate from the binary data structure having an action part specifying that the binary data structure is to be used for verifying that application protocol payload of network packets complies with the protocol validation specification, the security policy rule further indicating actions to be performed upon detection of a violation of the protocol validation specification.

27. The computer-readable medium of claim 26 wherein said validation code is configured in accordance with the respective protocol validation specification language of the protocol validation specification.

* * * * *